(No Model.) 2 Sheets—Sheet 1.

C. A. CHANDLER.
COTTON SEED HULLER.

No. 317,927. Patented May 12, 1885.

WITNESSES
A. L. White
H. Brown

INVENTOR
C. A. Chandler
by Wight & Brown
Attys.

(No Model.) 2 Sheets—Sheet 2.

C. A. CHANDLER.
COTTON SEED HULLER.

No. 317,927. Patented May 12, 1885.

WITNESSES
A. L. White
H. Brown.

INVENTOR
C. A. Chandler
by Knight & Brown
Attys.

UNITED STATES PATENT OFFICE.

CLARENCE A. CHANDLER, OF EAST BRIDGEWATER, MASSACHUSETTS, ASSIGNOR OF ONE-HALF TO FREDERIC C. MANN, OF SAME PLACE.

COTTON-SEED HULLER.

SPECIFICATION forming part of Letters Patent No. 317,927, dated May 12, 1885.

Application filed June 13, 1884. (No model.)

*To all whom it may concern:*

Be it known that I, CLARENCE A. CHANDLER, of East Bridgewater, in the county of Plymouth and State of Massachusetts, have invented certain Improvements in Cotton-Seed Hullers, of which the following is a specification.

This invention consists in certain improvements, hereinafter described and claimed, relating, first, to the knives secured to the rotating cylinder of a cotton-seed huller, and to the means for holding and adjusting said knives, and, secondly, to the construction of the concave, and to means for adjusting the same bodily in different directions, and for holding and adjusting the knives with which the concave is provided.

Figure 1:
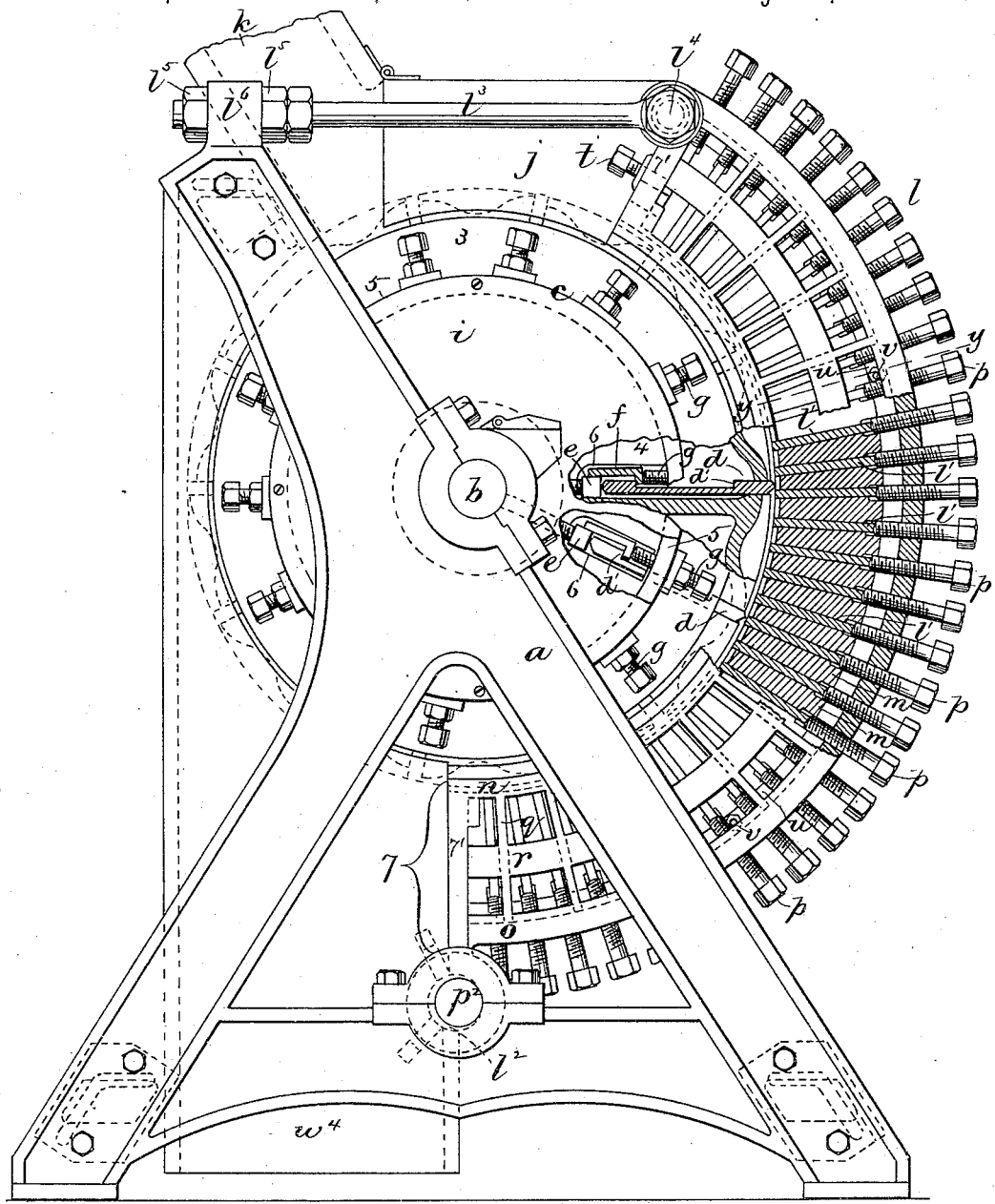
Figure 2:
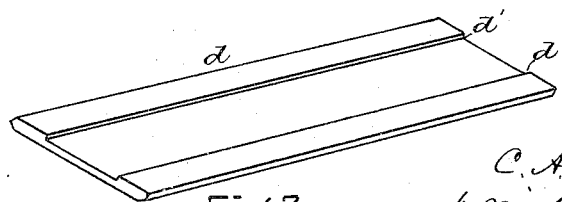
Figure 3:
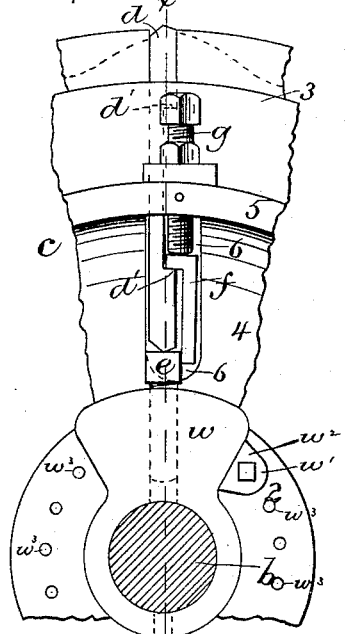
Figure 4:
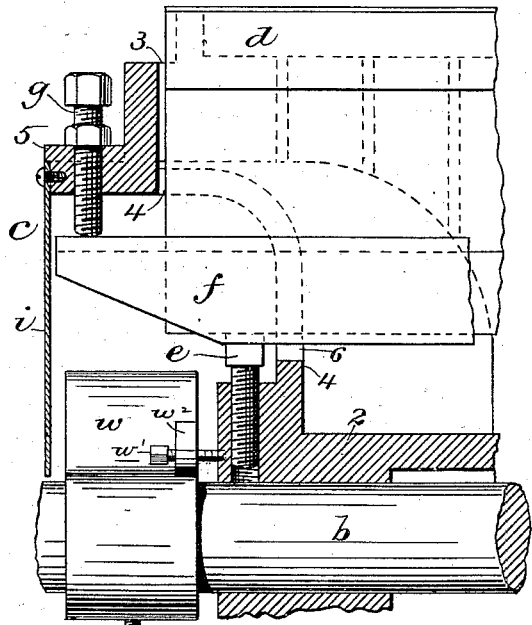
Figure 5:
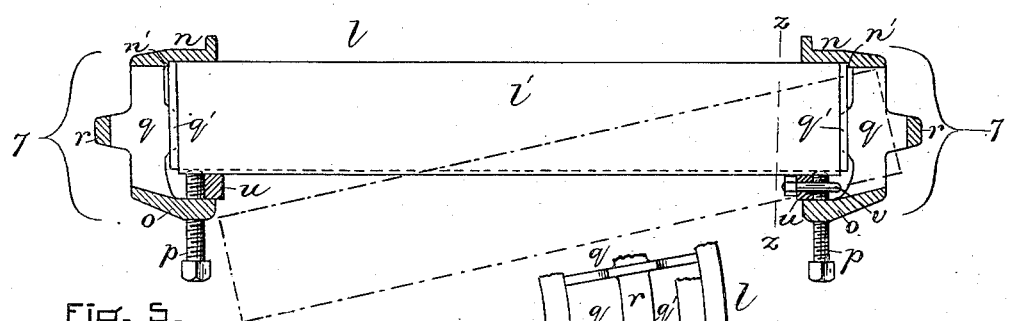
Figure 6:
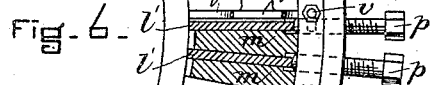
Figure 7:
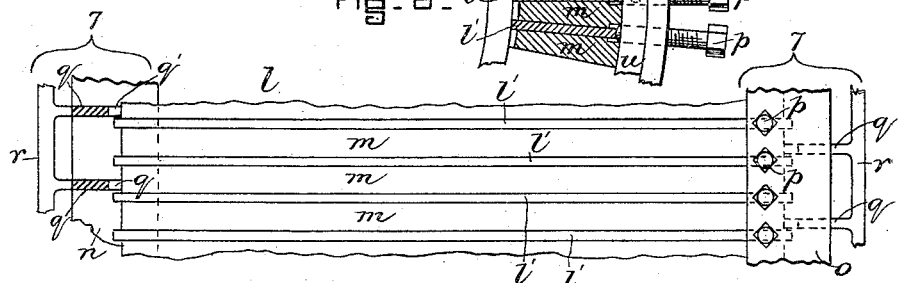

Of the accompanying drawings, forming a part of this specification, Figure 1 represents a side elevation, partly in section, of a cotton-seed huller provided with my improvements. Fig. 2 represents a perspective view of one of the cylinder-knives detached. Fig. 3 represents an enlarged elevation of a part of the cylinder. Fig. 4 represents a section on plane of line $x$ $x$, Fig. 3. Fig. 5 represents a section on line $y$ $y$, Fig. 1. Fig. 6 represents a section on line $z$ $z$, Fig. 5; and Fig. 7 represents a rear elevation of a portion of the concave.

The same letters of reference indicate the same parts in all the figures.

In the drawings, $a$ represents the supporting-frame, having bearings which support the arbor $b$ of the rotating cylinder $c$. The cylinder is composed of a central hub, 2, rigidly secured to the arbor $b$, (see Fig. 4,) a peripheral portion or body, 3, which is connected by end plates or webs, 4, with the hub portion, and is provided with flanges 5 at its opposite ends, said flanges being concentric with the arbor $b$. The end plates or webs, 4, are provided with radial slots 6 in which are located the blades $d$. Each blade is flat on one side, and is recessed on the other to form two shoulders, $d'$ $d'$, as shown in Figs. 1, 2, and 3, both edges of each blade being doubly beveled to form cutting-angles, either of which can be presented as the acting edge. Each blade bears at its inner edge against the heads of screws $e$, which are inserted in the hub 2 near its opposite ends. (See Fig. 4.) The blades are held in contact with said screws $e$ by means of key-plates $f$, which have lugs bearing on the inner shoulders, $d'$, of the blades, and are pressed against said shoulders by screws $g$, passing radially through the concentric flanges 5, and bearing against the outer edges of the key-plates. The blades are thus securely held against the screws $e$, and may be adjusted radially by adjusting said screws $e$, the key-plates and screws $g$ being capable of similar adjustment, so that they can hold the blades in any position to which they may be adjusted. The key-plates $f$ bear against the sides of the heads of the screws $e$, as shown in Figs. 1, 3, and 4, and thus lock said screws so that they cannot turn accidentally.

Plates or disks $i$ are screwed to the flanges 5 and cover the annular space inclosed by said flanges, said plates being centrally perforated to receive the arbor $b$.

The periphery of the cylinder is corrugated or fluted longitudinally, so as to present undulations in its transverse section, the highest points of the undulations being at the points where the blades $d$ project through the periphery, and the lowest points being midway between the blades, as shown in Fig. 1. This form of the periphery enables stones or other foreign matter in lumps or pieces too large to pass between the cylinder and concave to remain in a chamber, $j$, between the chute $k$, through which the seed to be hulled is admitted, and the upper end of the concave $l$, the stones or other articles finding their way to the upper end of the concave being forced outwardly in a radial direction by the undulations, so that the blades pass under such articles without impinging forcibly against them.

It will be seen that the form of the blades and the construction of the holding devices enable either edge of each blade to be presented at the periphery of the cylinder. The two edges of each blade may be differently beveled, so that one will present an angle more acute than the other, either edge being capable of use, as above set forth.

The concave $l$ is composed of a suitable frame, blades or plates $l'$ inserted therein, and holding devices for said blades, all hereinafter described. The frame is pivoted at its lower end at $l^2$ to the supporting-frame $a$, and connected at its upper end by bolts $l^3$ with the frame $a$, said bolts being pivoted at $l^4$ to the concave frame, and provided with adjustable check-nuts $l^5$, bearing against opposite sides of perforated lugs $l^6$, through which the bolts pass. By adjusting said nuts the concave can be turned on its pivots $l^2$, and thus moved toward and from the cylinder. The pivots $l^2$ are eccentrics formed on an arbor, $p^2$, journaled in bearings in the frame $a$. By partially rotating said arbor the concave can be raised or lowered. It will be seen, therefore, that the described means for lateral and vertical adjustment enable the concave to be located as desired with relation to the cylinder.

The frame of the concave is composed of two segmental side pieces, 7, suitably connected at the ends of the concave by cross-bars 7′, the whole forming a holder for the blades $l'$ and intermediate blocks, $m$. The side pieces are composed of the inner flanges, $n$, which constitute seats or bearings for the inner edges of the blades $l'$ of the concave, and the outer flanges, $o$, containing screws $p$, which bear on the outer edges of said blades, and radial bars $q$, connecting the flanges $n$ and $o$. Said bars $q$ are strengthened by segmental ribs $r$, the ribs, bars, and flanges of each side piece being preferably cast in a single piece. The seats or flanges $n$ are formed with shoulders $n'$, which bear against the ends of the blades $l'$ and prevent endwise movement of the latter.

In making up the acting surface of the concave (said surface being composed of the edges of the blades $l'$, as shown in Fig. 1) I commence at the lower end of the frame and place a wooden block, $m$, against the cross-bar connecting the side pieces, 7, at said end. On the wooden bar I place a blade, $l'$, and clamp it in place by screws $p$, as above described. I then place another wooden block above the blade, and on that block place a second blade, which is secured in the same way, and so on until the frame is filled with alternating blocks and blades. One or more set-screws, $t$, Fig. 1, inserted in the cross-bar connecting the side pieces, 7, at the upper end of the concave, bears against the last blade of the series and holds it in place laterally, and thus confines the entire series of blades and blocks against lateral displacement. The blocks $m$ are so formed that the upper surface of the blades $l'$, if continued inwardly, would fall somewhat below the axial center of the cylinder, so that the ends of the blades, which are at right angles with the sides, retreat sufficiently from their upper corners to give the requisite clearance, the upper corners being those which meet the cotton-seeds as they are forced along the concave by the rotation of the cylinder. The cross-bars $q$, connecting the flanges $n$ $o$ of the side pieces, 7, have inwardly-projecting lugs $q'$, adapted to bear against the ends of the wooden blocks $m$, as shown in Figs. 6 and 7. The cross-bars $q$ of one side piece alternate in position with those of the other side piece, as shown in Fig. 7, so that each block $m$ bears against a lug, $q'$, only at one end, every alternate block having a bearing at one end, while the other blocks have bearings at the opposite ends. The wooden blocks $m$ are held in place by segmental bars $u$ $u$, each of which is secured by means of hooked bolts $v$ to two or more of the blade-holding screws $p$. Said bars $u$ bear against the outer edges of the blocks $m$, as clearly shown in Figs. 5 and 6, the outer edges of the bars $u$ bearing against the flanges $o$.

When it is desired to remove the blades $l'$ and blocks $m$, the bars $u$ are removed and the screws $p$ are withdrawn from the flanges $o$. Each blade and block may now be moved endwise until one of its ends can swing outwardly beyond the inner edge of the flange $o$ of one of the side pieces, 7, as indicated by dotted lines in Fig. 5, and then may be entirely withdrawn by an opposite endwise movement.

The blades and blocks are inserted by reversing the above-described operation.

The object of the alternating arrangement of the cross-bars $q$ is to enable the blocks $m$ to be removed and applied, as above described. This operation could not be effected if the cross-bars of each side piece coincided with those of the other, for in that event the blocks $m$ bearing against the cross-bars would be obstructed at both ends, so that an endwise movement in either direction would be impossible.

The operation of the machine as a whole is similar to that of other machines for the same purpose. The seed, being delivered to the cylinder by the chute $k$, is carried by the cylinder to the concave, where the hulls are broken by the joint action of the knives $d$ of the cylinder and the knives $l'$ of the concave, the seed, with the broken hulls, passing away from the machine through a chute, $w^4$, to a suitable receptacle.

The arbor $b$ of the cylinder may be provided with one or more (preferably two) counterbalancing-weights, $w$, which may be placed in any desired position to overcome any preponderance at one side of the cylinder, caused by variations in the weight of the knives $d$. As the cylinder rotates at a very high rate of speed it is important that it should be as perfectly balanced as possible. The advantage of the adjustable weights will therefore be readily seen. The weights may be secured by means of screws $w'$ in lugs $w^2$ on the weights entering tapped orifices $w^3$ in the hub 2, said orifices being arranged in a circular series, as shown, so that the weights may be caused to project in any direction radial to the arbor $b$.

I claim—

1. The radially-slotted cylinder having the radial knives $d$, grooved in their faces, the radial supports $e$ for said knives, and adjustable devices independent of supports e bearing on the shoulders of the grooves in the knives, all combined, substantially as stated.

2. The radially-slotted cylinder having the radial knives, the adjustable supports e for said knives, the key-plates bearing against shoulders on the knives, and the screws adapted to press the key-plates inwardly against the knife-shoulders, as set forth.

3. In a hulling-machine, a cylinder-knife, d, provided with two cutting-edges, and recessed on one side to form square-edged shoulders d' d', as set forth.

4. In a hulling-machine, the combination, with the cylinder, of the concave pivoted at its lower end to the supporting-frame, and pivoted bolts l³, passing through lugs on the frame, and provided with adjustable check-nuts, as set forth.

5. The combination of the concave frame composed of the connected side pieces having flanges n o, the alternating blades l', and blocks m, having their ends placed between said flanges n o, and holding devices whereby said blades and blocks are secured to the frame, as set forth.

6. The concave frame composed of the connected side pieces, 7 7, having flanges n o, clamping-screws p, and segmental bars u, combined with the alternating blades l', and blocks m, secured in said frame by the screws p and segmental bars u, as set forth.

7. The combination of the concave frame composed of the connected side pieces having flanges n o, screws p, and cross-bars q, the cross-bars in one side piece being arranged to alternate with those in the other, the blades l', secured in place by the screws p, and the blocks m, alternating with the blades, and each bearing at one end against a cross-bar, q, as set forth.

In testimony whereof I have signed my name to this specification, in the presence of two subscribing witnesses, this 9th day of June, 1884.

CLARENCE A. CHANDLER.

Witnesses:
C. F. BROWN,
A. L. WHITE.